US 6,600,612 B2

(12) United States Patent
Okorocha

(10) Patent No.: US 6,600,612 B2
(45) Date of Patent: Jul. 29, 2003

(54) LENS SYSTEM HAVING RESILIENT MEMBERS TO AXIALLY POSITION OPTICS

(75) Inventor: Livyn O. Okorocha, Cincinnati, OH (US)

(73) Assignee: 3M Innovative Properties Company, St. Paul, MN (US)

( * ) Notice: Subject to any disclaimer, the term of this patent is extended or adjusted under 35 U.S.C. 154(b) by 97 days.

(21) Appl. No.: 09/855,974

(22) Filed: May 15, 2001

(65) Prior Publication Data

US 2002/0171947 A1 Nov. 21, 2002

(51) Int. Cl.[7] ................................................. G02B 7/02
(52) U.S. Cl. ........................................ 359/819; 359/811
(58) Field of Search ................................. 359/819, 827, 359/828, 830, 694, 811, 820; 348/745, 746, 781, 785, 749

(56) References Cited

U.S. PATENT DOCUMENTS

| | | | |
|---|---|---|---|
| 1,250,820 A | 12/1917 | Dyer et al. ................... 359/808 |
| 3,083,773 A | 4/1963 | Nagel et al. .................. 166/176 |
| 3,757,031 A | 9/1973 | Izraeli ......................... 174/138 |
| 4,371,594 A | 2/1983 | Ohara et al. .................... 429/97 |
| 4,405,161 A | 9/1983 | Young et al. .................... 285/80 |
| 4,460,245 A | 7/1984 | Shimizu ........................ 359/820 |
| 4,510,215 A | 4/1985 | Adam ........................... 429/99 |
| 4,526,440 A | 7/1985 | Lundberg et al. ............. 359/827 |
| 4,612,680 A | 9/1986 | Daiguji ........................... 14/22 |
| 4,688,337 A | 8/1987 | Dillner et al. .................. 24/616 |
| 4,693,555 A | 9/1987 | Arai et al. ..................... 359/820 |
| 4,776,681 A | 10/1988 | Moskovich ................... 359/649 |
| 4,778,252 A * | 10/1988 | Filho .......................... 359/819 |
| 4,806,440 A | 2/1989 | Hahs, Jr. et al. ............. 429/100 |
| 5,056,197 A | 10/1991 | Cohen .......................... 24/304 |
| 5,202,706 A | 4/1993 | Hasegawa ................... 359/819 |
| 5,214,533 A | 5/1993 | Moracchini ................... 359/367 |
| 5,249,082 A | 9/1993 | Newman ...................... 359/813 |
| 5,276,555 A | 1/1994 | Sansbury ..................... 359/826 |
| 5,488,514 A * | 1/1996 | Bruning et al. .............. 359/811 |
| 5,576,895 A | 11/1996 | Ikeda .......................... 359/811 |
| 5,577,836 A | 11/1996 | Vent et al. .................... 362/515 |
| 5,577,855 A | 11/1996 | Leyden et al. ............... 403/291 |
| 5,617,259 A | 4/1997 | Inoue ........................... 359/820 |
| 5,642,235 A * | 6/1997 | Ichikawa ..................... 359/811 |
| 5,652,680 A | 7/1997 | Kashihara et al. ........... 359/819 |
| 5,653,550 A | 8/1997 | Mutz et al. ................... 403/329 |
| 5,678,953 A | 10/1997 | Usui et al. ................... 403/329 |
| 6,115,082 A * | 9/2000 | Rudolph ...................... 348/749 |
| 6,196,755 B1 | 3/2001 | Okorocha et al. ........... 403/313 |
| 6,285,416 B1 | 9/2001 | Mitchell et al. ............. 348/745 |
| 6,441,976 B1 * | 8/2002 | Okorocha .................... 359/820 |

\* cited by examiner

Primary Examiner—Georgia Epps
Assistant Examiner—Gary O'Neill
(74) Attorney, Agent, or Firm—Kevin S. Rooney; Bruce E. Black

(57) ABSTRACT

An optical lens cell, especially useful in projection televisions, includes a tubular optic support structure having an interior with a longitudinal central axis and a first optic support surface extending around the longitudinal central axis. The first optic support surface receives a first optic having an outer circumferential edge and a first mounting surface portion adjacent the circumferential edge. The mounting surface portion of the first optic extends transverse to the longitudinal central axis. A plurality of raised surface members are provided on the optic support surface. At least one resilient member extends transverse to the longitudinal central axis and is configured to contact the mounting surface portion of the first optic when the first optic is positioned adjacent the optic support surface. The resilient member applies a biasing force against the mounting surface portion of the first optic along the longitudinal central axis to force the first optic against the raised surface members of the first optic support surface.

19 Claims, 4 Drawing Sheets

LENS SYSTEM HAVING RESILIENT MEMBERS TO AXIALLY POSITION OPTICS

FIELD OF THE INVENTION

The present invention generally relates to optical lens assemblies and, more particularly, to lens assemblies especially useful in projection televisions.

BACKGROUND OF THE INVENTION

A projection television set typically includes three cathode ray tubes (CRTs), corresponding to the colors red, blue and green. A projection lens assembly uses a plurality of optics to magnify the image appearing on the CRT faceplate and project that image onto a much larger viewing screen. Typical CRTs used in projection televisions typically have a diameter of 3 to 9 inches. The image projected onto the screen generally has a size ranging from 40 to 60 inches or larger measured diagonally.

Each CRT has an associated magnifying lens system mounted adjacent to the CRT faceplate. In one illustrative system, the lens assembly is formed with at least one "A" optic or element, at least one "B" optic or element and at least one "C" optic or element. Regardless of the number of optics, these are generally referred to in the art as "A", "B" and "C" lens groups. That is, each "group" may be comprised of one or more optics. The "B" lens group usually includes an optic formed of glass, while the "A" and "C" optics may be formed of plastic, such as a molded acrylic plastic. However, it should be understood that each group may comprise one or more optics formed of glass and one or more optics formed of plastic.

Assembly of the optics within the optic mounting structure has been a continuing challenge in terms of maintaining ease of assembly while also properly positioning the optics within a supporting structure, such as a generally cylindrical lens cell. The optics must be properly positioned within the lens cell to ensure proper focus and to prevent any movement of the optics relative to the lens cell especially during transit and use. Currently, during the assembly of projection television lens systems, the optics are retained within grooves or channels within the interior of the lens cell. Annular side walls of these channels include raised flats which force the edge of the optic against an opposite wall of the groove or channel. This creates an interference fit between the lens cell and the optic. Due, however, to the rigid nature of the flats used to properly position the lens, and the rigid nature of the opposing wall, the assembly forces required to fully seat the optics within the groove or channel can be exceedingly high. The high assembly force has required a specialized assembly fixture with the capability to generate high forces to seat the optics within the lens cell. As a result, this creates high mechanical stress on the assembled lens system. Also, during the act of seating an optic within the groove or channel, the optic itself may actually remove material from the raised flat and therefore improperly position the optic within the lens cell. This improper positioning can lead to potential focusing problems.

For at least these reasons, there is a continuing need for lens assemblies which address assembly difficulties and related focusing problems while, for example, maintaining relatively low cost and complexity associated with manufacturing the lens assemblies.

SUMMARY OF THE INVENTION

The present invention generally provides a lens cell, especially useful in projection televisions, including a tubular optic support structure having an interior with a longitudinal central axis and a first optic support surface extending around the longitudinal central axis. The tubular optic support structure receives a first optic having an outer circumferential edge and a mounting surface portion adjacent the circumferential edge. The mounting surface portion extends transverse to the longitudinal cental axis. A plurality of raised surface members are formed on the first optic support surface. At least one resilient member extends transverse to the longitudinal central axis and is configured to contact the first mounting surface portion of the first optic when the first optic is positioned adjacent the first optic support surface. The resilient member is configured to apply a biasing force against the first mounting surface portion along the longitudinal central axis to force the first optic against the raised surface member of the first optic support surface. The resilient nature of this member assists in lowering the required assembly forces. That is, the resilient member may first be resiliently biased in an axial direction away from the first optic during seating of the optic within the tubular optic support structure and, thereafter, maintains a biasing force against the first optic to maintain the first optic in proper position against the raised surface members.

The first optic support surface, the raised surface members and the resilient member are preferably positioned within a groove in the interior of the optic support structure. Although the resilient member may be any member which facilitates the intended function, such as metal springs, separate rubber or other elastomeric inserts or molded rubber or elastomeric members, the preferred structure is a flexible tab member in the form of a cantilever. More preferably, four cantilevered flexible tab members are used at equidistant, spaced locations surrounding the first optic. These members are molded into a wall defining a portion of the groove in which the first optic sits.

In the preferred embodiment, the lens system includes four flexible tab members at equidistant spacings, however, many configurations and different numbers of flexible tab members may be utilized in accordance with the invention. It is preferred that, regardless of the number of flexible tab members, the spacings be equidistant such that constant force is applied against the edge of the optic around the entire circumference thereof. The preferred lens system includes multiple optics and, preferably, each of the optics is mounted within the optic support structure in the above described manner. There may be instances, however, in which only certain optics need to be mounted in the above described manner depending on the application needs.

Additional objectives, advantages and features of the invention will become more readily apparent to those of ordinary skill in the art upon review of the following detailed description of the preferred embodiments, taken in conjunction with the accompanying drawings.

DETAILED DESCRIPTION OF THE PREFERRED EMBODIMENT

Figure 1:
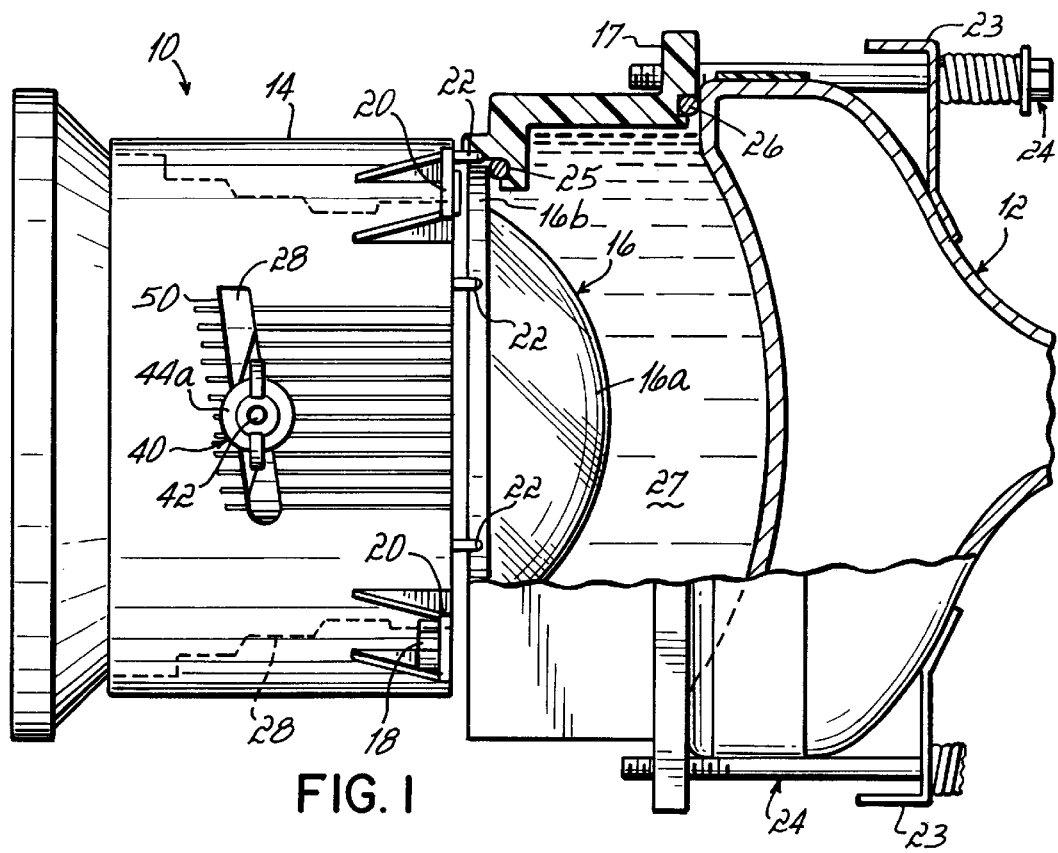
FIG. 1 is a side elevational view of a lens system constructed in accordance with the invention and partially fragmented to show certain interior details thereof.
Figure 2:
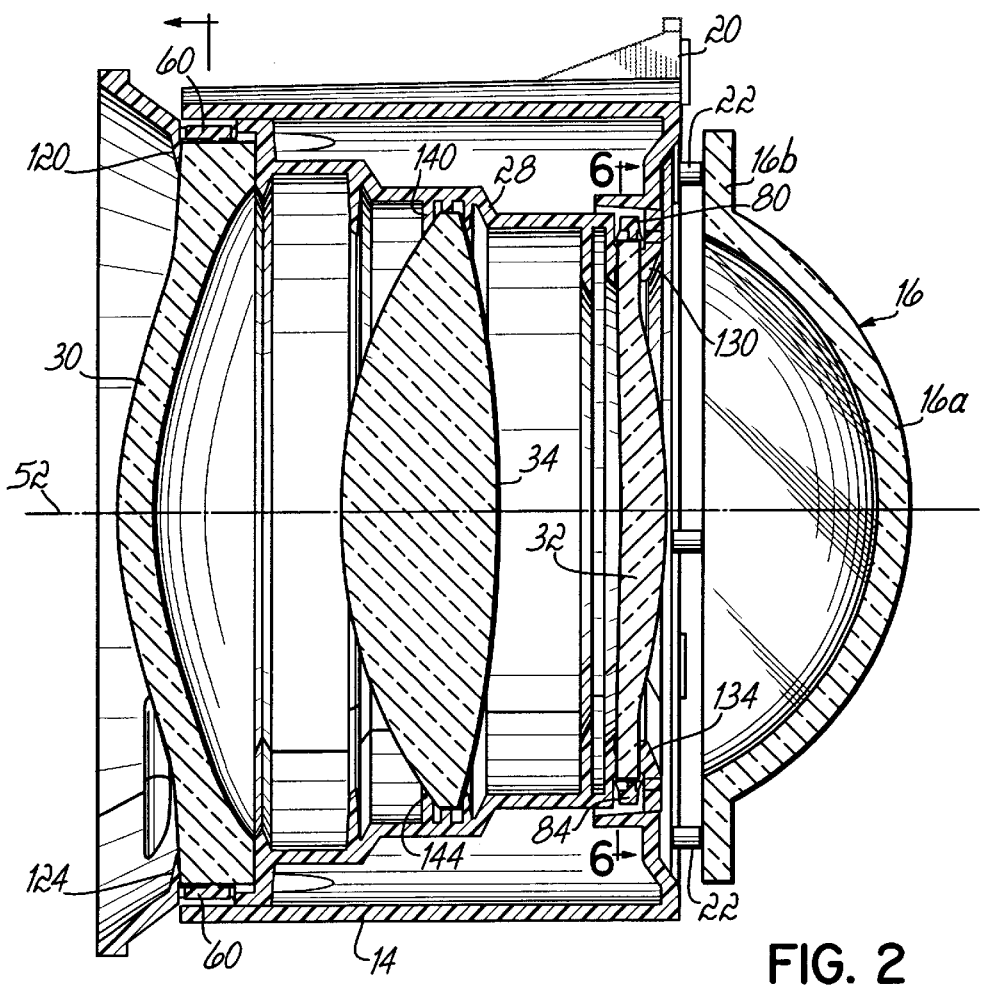
FIG. 2 is a cross sectional view taken along the central longitudinal axis of the lens cell taken from the system shown in FIG. 1.

Referring generally to FIGS. 1 and 2, lens system 10 is constructed in accordance with a preferred embodiment of the invention, although it will be understood that other configurations may be utilized within the spirit and scope of the invention. The lens system 10 is specifically suitable for use in projection televisions sets and will typically be used in conjunction with a CRT 12 associated with one of the colors red, green or blue. The lens system 10 includes an outer, generally cylindrical focus mount 14. The lens assembly 10 includes a "C" optic or element 16 referred to in the art as a field flattener. The focus mount 14 is mounted within the interior of the television set (not shown) through the use of a mounting member or coupler 17 and is secured to the coupler 17 by suitable fasteners 18 and flange elements 20. The field flattener or "C" element 16 is fixed between the focus mount 14 and the coupler 17 and is located in a centered position by pins 22. The "C" optic or element 16 is formed from a clear plastic as is conventional in the art and has a convex surface 16a facing the CRT 12.

As further shown in FIG. 1, the CRT 12 is mounted against coupler 17 by a bracket 23 and spring-loaded fastener assemblies 24. O-rings 25, 26 are respectively positioned between a flange portion 16b of "C" element 16 and the coupler 17 and between the CRT 12 and the coupler 17. This forms a space 27 between the "C" element 16 and the CRT 12 for receiving a liquid coolant as is conventional.

Referring more specifically to FIG. 2, an optic supporting structure or lens cell 28 carries three optics including an "A" element 30, a "B" element 34, and a B/C corrector element 32. Corrector 32, which is closest to the "C" element 16, is formed from clear plastic as is the "A" element 30. The larger, centrally located "B" element 34 is formed from glass and provides the majority of the positive magnifying power to the lens system 10. As mentioned above, each of these elements may be referred to as a group in the industry, and may or may not include multiple optics. Referring back to FIG. 2, it will be appreciated that the CRT 12 directs light initially through the "C" optic 16 and then through the respective corrector element 32 and "B" element 34 and finally the "A" element 30 before the light and resulting image is received by the television screen (not shown) positioned on a side of the lens system 10 opposite to the CRT 12.

Figure 4:
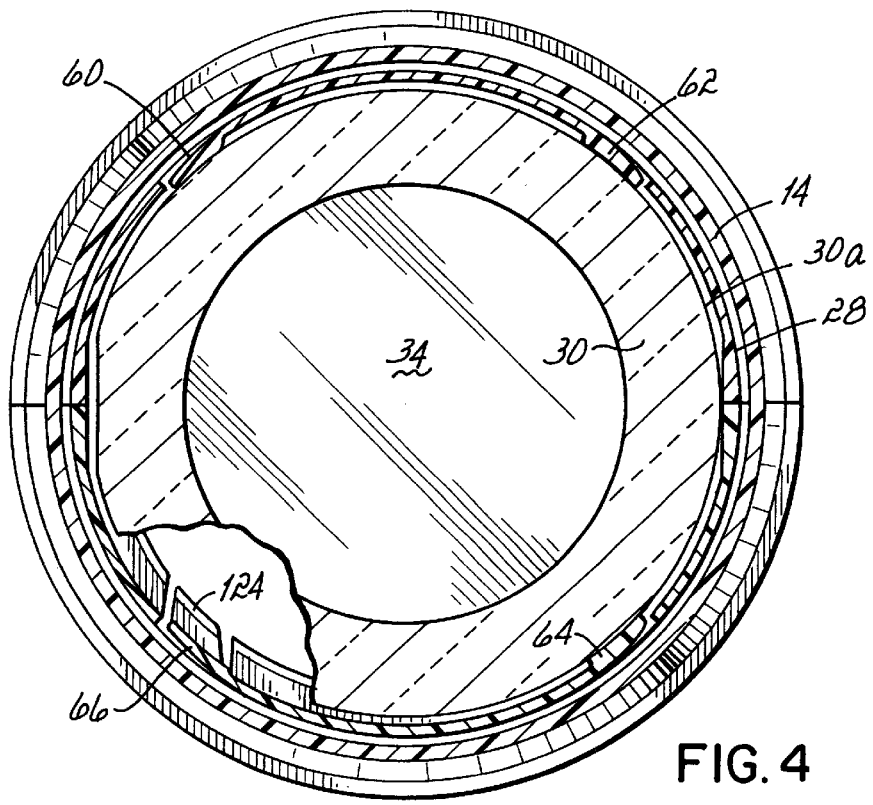
FIG. 4 is a cross sectional view taken generally along line 4—4 of FIG. 2.

The lens cell 28, including optics or elements 30, 32, 34, may be manually adjusted in an axial manner in left and right directions as viewed in FIGS. 3 and 4 relative to the "C" optic 16. This is an initial adjustment typically made at the factory during the manufacturing process. To facilitate this adjustment, as shown in FIG. 1, a fastener assembly 40 comprising an externally threaded fastener 42 and a nut assembly 44 couples focus mount 14 to lens cell 28. Fastener 42 extends through a slot 50 in the focus mount 14. The nut assembly 44 is loosened allowing the focus mount 14 to rotate relative to the lens cell 28. As shown in FIG. 2, the slot 50 extends at a nonperpendicular angle relative to the axis 52 (FIG. 2) of the lens system 10. Therefore, as the focus mount 14 is rotated, the fastener 42 moves along the axis 52 and thereby moves the lens cell 28 and optics 30, 32, 34 along the axis 52 either toward or away from the CRT 12 depending on the direction of rotation. Once the proper focus has been set in this manner, the nut assembly 44 is tightened and the distance between the respective optics or elements 30, 32, 34 relative to the "C" optic 16 is fixed.

Figures 3A, 3B:
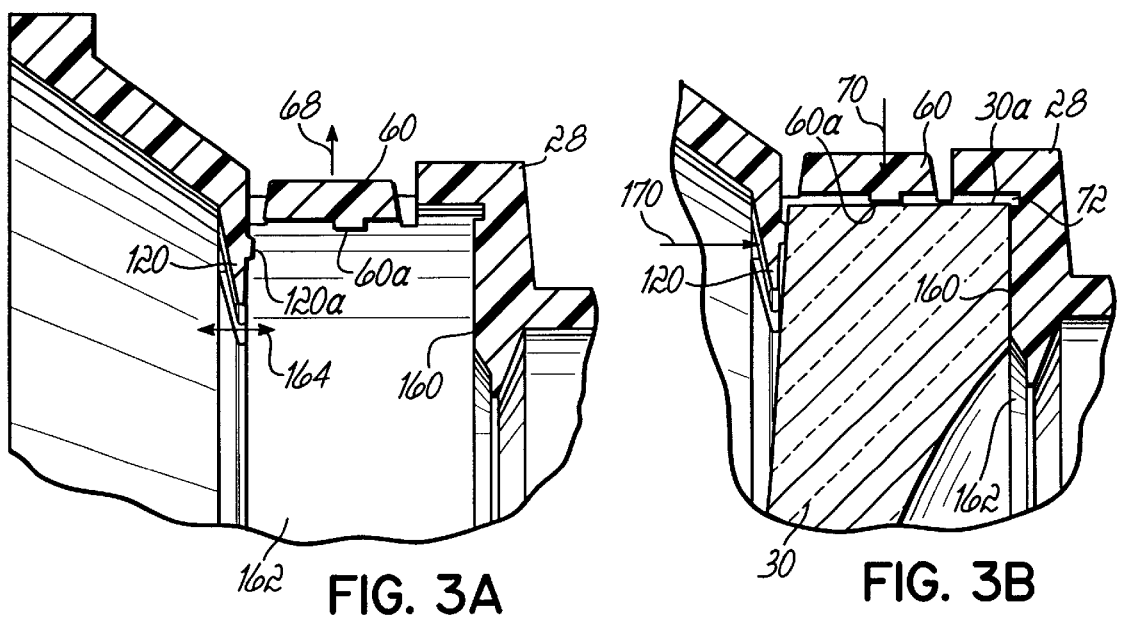
FIG. 3A is an enlarged view of a resilient mounting member of the invention without the optic.
FIG. 3B is an enlarged cross sectional view similar to FIG. 3A but showing the optic assembled with the optic support structure and resilient member.

Referring now to FIGS. 3A, 3B and 4, four equally spaced resilient members 60, 62, 64, 66 are provided on lens cell 28. These members 60, 62, 64, 66 take the form of cantilevers movable generally radially outward and radially inward with respect to the central longitudinal axis 52 shown in FIG. 2. As best shown in FIGS. 3A and 3B, each resilient member 60, 62, 64, 66 is configured identically and, therefore, a detailed description and view of one member will suffice. Thus, as particularly shown in FIG. 3A, member 60 includes a projection 60a for contacting a circumferential edge 30a of optic 30 (FIG. 3B). Resilient member or tab 60 is normally disposed in the position shown in FIG. 3A, but may be moved in the direction or arrow 68 against a counteracting radially inward directed biasing force. Thus, when optic 30 is inserted into lens cell 28 during assembly, tab 60 moves radially outward to the position shown in FIG. 3B thereby exerting a radially inward force in the direction of arrow 70 against circumferential edge 30a. This facilitates an interference fit of optic 30 in lens cell 28. After assembly, a space 72 exists between remaining portions of the adjacent interior wall of lens cell 28 and circumferential edge 30a. Therefore, any additional thermal expansion of optic 30 in a radially outward direction will be accommodated by space 72 and will only cause flexible tab 60 to move further in a radially outward direction. The radial dimension or height, as viewed in FIG. 3B, of space 72 is chosen such that it exceeds the maximum expected thermal expansion of optic 30 in that direction. In this manner, lens cell 28 will exert radial forces against optic 30 with resilient members 60, 62, 64, 66 as opposed, for example, to any other optic mounting structure which would tend to bind optic 30 or prevent expansion and thereby cause optic distortion.

Figure 5:
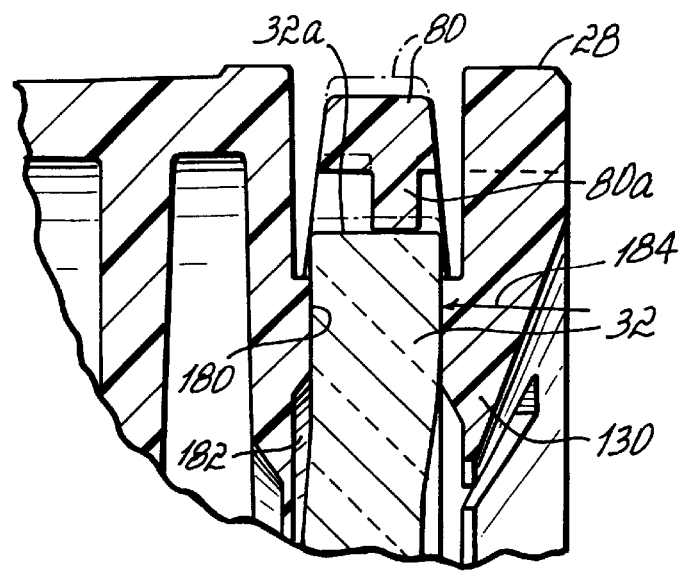
FIG. 5 is an enlarged cross sectional view similar to FIG. 3B, but showing another optic assembled in the optic support structure and in contact with another resilient member thereof.
Figure 6:
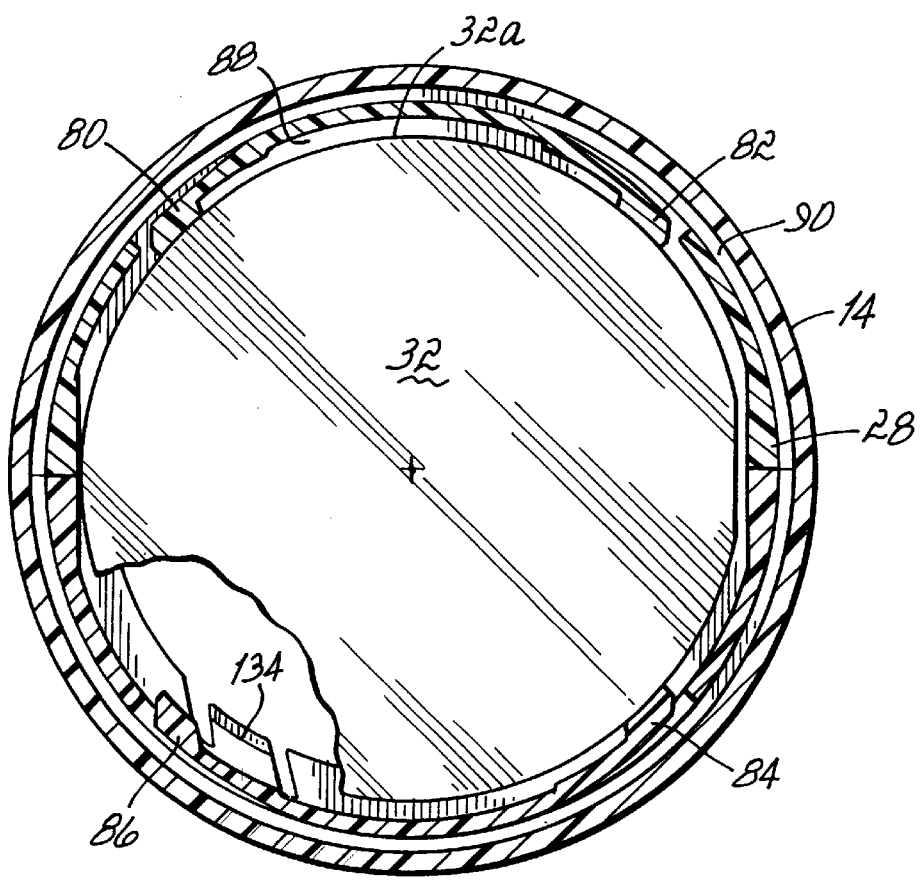
FIG. 6 is a cross sectional view taken generally along line 6—6 of FIG. 2.

Turning now to FIGS. 5 and 6, optic 32 is mounted within lens cell 28 in a manner similar to that described above with respect to optic 30. As shown best in FIG. 6, four equally spaced flexible tab members 80, 82, 84, 86 extend radially inward to form the contact points with the circumferential edge 32a of optic 32. This leaves a space 88 around the remaining circumferential portions of optic 32. As with optic 30, and the description provided above, each flexible tab member 80, 82, 84, 86 moves radially outward when optic 32 is assembled within lens cell 28. Thus, four equal radially inward directed retention forces are exerted on optic 32 at locations spaced 90° apart corresponding to the spacings of flexible tab members 80, 82, 84, 86. As further shown in FIG. 5, when optic 32 undergoes heat induced thermal expansion in the radially outward direction, flexible tab member 80 can move from the position shown in solid lines to the position shown in phantom lines. The same situation occurs with each of the other flexible tab members 82, 84, 86 to help ensure that binding does not occur between lens cell 28 and optic 32 which might cause optic distortion and defocusing of lens system 10. A sufficient spacing 90 is left between the flexible tab members 80, 82, 84, 86 and focus mount 14 to ensure that the maximum thermal expansion of optic 32 may occur without tab members 80, 82, 84, 86 contacting focus mount 14 as a result of the expansion.

The lens cell further includes resilient mounting members for applying an axial retention force on each optic 30, 32, 34, that is, a force extending in the direction of axis 52. This force maintains each optic in a stationary condition and in an accurately placed position along axis 52. Preferably, resilient members are placed in locations corresponding to the locations of the resilient members described above around the circumference of each optic. Therefore, in this preferred embodiment, each optic 30, 32, 34 is also held in place by four flexible tab members which bear against a mounting surface portion of each optic adjacent and transverse to the circumferential edge of the optic. FIG. 2 illustrates two of the four flexible tab members associated with each optic 30, 32, 34, i.e., tab members 120, 124, 130, 134, and 140, 144. Representative flexible tab members 120 and 130 are shown in greater detail in FIGS. 3A and 3B, associated with optic 30, and in FIG. 5 associated with optic 32. It will be appreciated that, although the channel holding optic 34 does not include resilient members radially bearing on the circumferential edge of optic 34, the channel includes four equidistantly spaced flexible tab members (two shown at 140, 144 in FIG. 2) and opposed raised surface portions or flats, one pair of which is shown in FIG. 7 at 142, arranged and configured as described in more detail with respect to the corresponding tab and raised flat elements in FIGS. 3A, 3B and 5.

Referring more specifically to FIGS. 3A and 3B, flexible tab member 120 is formed as a cantilevered member extending radially inward and directly opposed to a raised surface portion or flat 160 on the opposite side of a channel 162 in lens cell 28. Flexible tab member 120 moves in the direction of arrow 164 with a resilient bias. A raised projection 120a provides a contact point for optic 30 and the distance between this raised projection 120a and the raised surface portion or flat 160 on the opposite side of the channel 162 is slightly less than the thickness of optic 30 at this location. Therefore, as optic 30 is inserted in place as shown in FIG. 3B, the flexible tab 120 moves slightly outward from channel 162 in an axial direction. Therefore, when optic 30 is seated as shown, tab 120 applies a force in the axial direction represented by arrow 170 in FIG. 3B. This forces optic 30 against the raised surface portion or flat 160 and therefore ensures proper, accurate positioning as well as a secure interference fit of optic 30 within the lens cell 28.

With reference to FIG. 5, which illustrates one flexible tab member 130 out of four identically configured tab members which are equidistantly spaced from each other and used in the same manner described above to force optic 32 against a raised surface portion or flat 180 on the opposite side of a channel 182. Thus, an axial force is applied in the direction of arrow 184 to retain the optic 32 against the raised flat 180 in an accurate and secure position. Four equidistantly spaced flexible tabs are used for each optic 30, 32, 34 for applying an axial force to the respective optic in the manner described in connection with FIGS. 3A, 3B and 5. It will be understood, however, that the numbers, configurations and types of flexible tabs or other resilient members may be changed based on the needs of the application. When using individual resilient members or flexible tabs, equidistant spacings are desirable to ensure that consistent axial force is applied around the entire diameter of the corresponding optic. In the preferred embodiment, a force ratio of 3:1 is preferably achieved between the radial force provided by the circumferential tabs or resilient members, such as members 60, 62, 64, 66, and the axial force provided by the flexible tabs such as 120, 124 (only two of four shown in FIG. 2). For example, the tabs applying a radial force in this illustrative projection television lens system 10 each exert about 1.5 pounds of force whereas the tabs supplying an axial force provide 0.5 pounds of force or less. In this illustrative example, the lens cell and all associated tabs are integrally molded from polycarbonate using an injection molding process.

Figure 8:
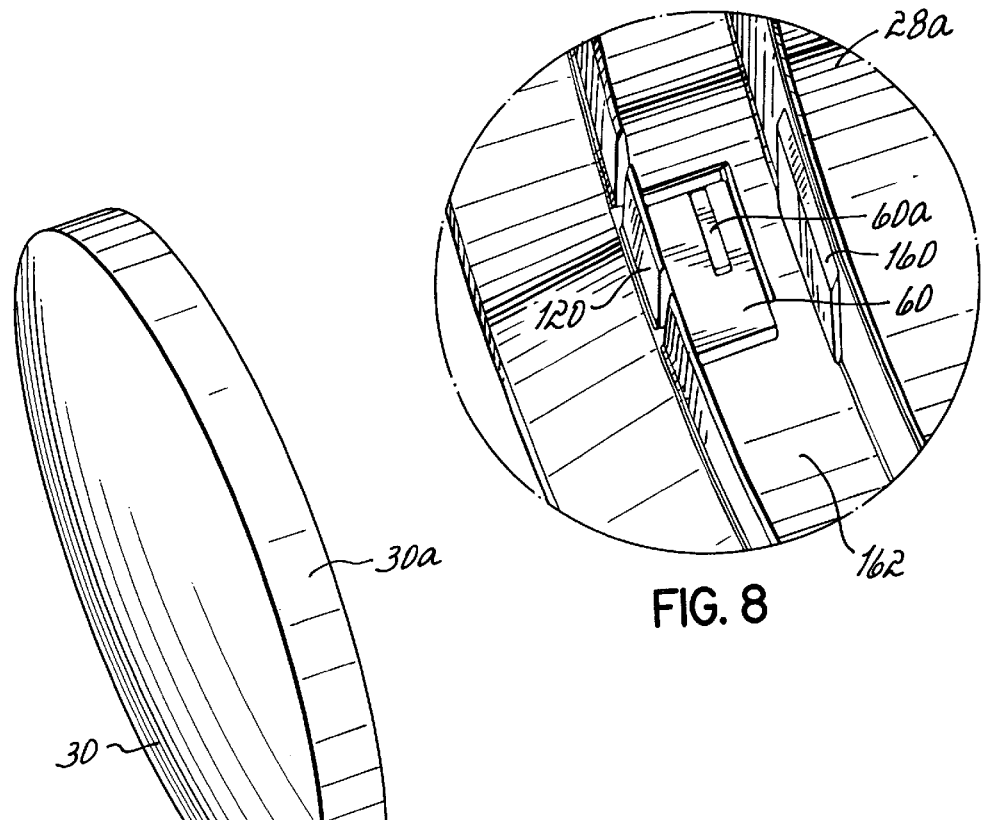
FIG. 8 is an enlarged view of the encircled portion 8 shown in FIG. 7.
Figure 7:
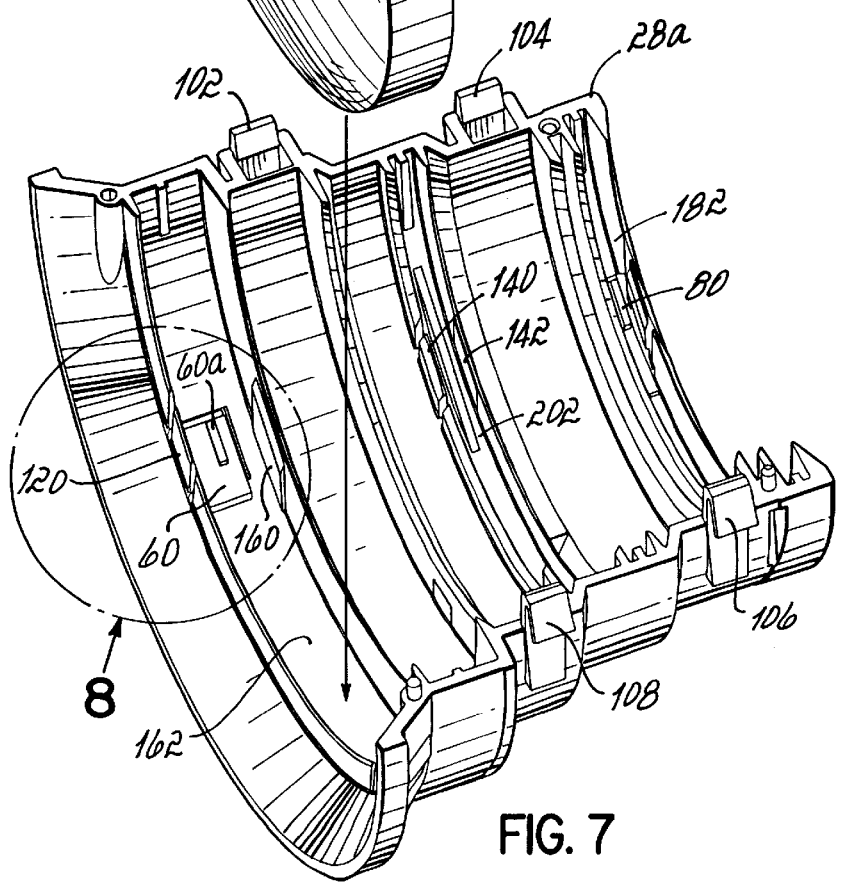
FIG. 7 is a disassembled perspective view showing one half of the optic support structure or lens cell and one optic being inserted therein.

Turning now to FIGS. 7 and 8, assembly of the optics 30, 32, 34 within the lens cell 28 will be understood, although various elements are deleted for clarity. Lens cell 28 more specifically comprises two halves, with one half 28a being shown in FIG. 7 and the other half being of identical design. The two halves are snapped together with hook-like snap fasteners 102, 104, 106, 108. Three grooves or channels 162, 182, 202 are provided for respectively retaining the circumferential edges of optics 30, 32, 34. Lens cell 28 is generally cylindrical and channels 162, 182, 202 are generally circular, however, these shapes may be altered into other types of tubular and annular shapes depending on the design of the optics or other considerations. In this embodiment, only grooves 162 and 182 include the flexible tab members applying a radial force as described above, since the glass optic 34 which is contained in groove 202 will not undergo any significant thermal expansion during use. It will be understood, however, that flexible tab members or other resilient mounting structure, may be incorporated for optic 34 as this may, for example, assist with lessening the adverse effects of assembly forces. Once all three optics 30, 32, 34 are inserted, as generally illustrated in FIG. 7 with respect to optic 30, the two halves of the lens cell are snapped together and the remainder of lens system 10 may be assembled as shown in FIG. 1. As will be understood best from a review of FIGS. 3A, 3B, 5 and 8, as each of the respective optics 30, 32, 34 are inserted into the corresponding channels 162, 182, 202, the flexible tabs which exert axial forces, such as tabs 120 and 130, will move slightly away from the adjacent mounting surface portion of the optic to allow full seating of the optic against the corresponding circumferential tab, such as tabs 60 and 80. Tabs 120 and 180, as well as the remaining tabs supplying axial force, may include slight cam surfaces to allow easier seating of the corresponding optic.

While the present invention has been illustrated by a description of a preferred embodiment and while this embodiment has been described in some detail, it is not the intention of the Applicant to restrict or in any way limit the scope of the appended claims to such detail. Additional advantages and modifications will readily appear to those skilled in the art. The various features of the invention may be used alone or in numerous combinations depending on the needs and preferences of the user. This has been a description of the present invention, along with the preferred methods of practicing the present invention as currently known.

However, the invention itself should only be defined by the appended claims, wherein I claim:

1. An optical lens cell comprising:
   a tubular optic support structure having an interior with a longitudinal central axis and a first optic support surface extending around the longitudinal central axis for receiving a first optic having a first outer circumferential edge and a first mounting surface portion adjacent said first circumferential edge and extending transverse to the longitudinal central axis,
   a plurality of raised surface members positioned on said first optic support surface and raised from said first optic support surface in a direction extending along the longitudinal central axis, and at least a first resilient member extending transverse to said longitudinal central axis and configured to contact said first mounting surface portion of the first optic when said first optic is positioned adjacent said first optic support surface, said first resilient member further configured to apply a biasing force against said first mounting surface portion along the longitudinal central axis to force said first optic against said raised surface members of said first optic support surface.

2. The optical lens cell of claim 1, wherein said first optic support surface, said raised surface members and said first resilient member are positioned within a groove in the interior of said optic support structure.

3. The optical lens cell of claim 1, wherein:
said interior of said optic support structure further includes a second optic support surface extending around the longitudinal central axis for receiving a second optic having a second outer circumferential edge and a second mounting surface portion adjacent said second circumferential edge and extending transverse to the longitudinal central axis, a plurality of raised surface members on said second optic support surface, and at least a second resilient member extending transverse to said longitudinal central axis and configured to contact said second mounting surface portion of the second optic when said second optic is positioned adjacent said second optic support surface, said second resilient member further configured to apply a biasing force along the longitudinal central axis to force said second optic against said raised surface members of said second optic support surface.

4. The optical lens cell of claim 1, wherein said first resilient member further comprises a first flexible tab member angled toward said first optic support surface and configured to be resiliently biased in an axial direction to provide an interference fit when the first optic is contained in said interior of said optic support structure.

5. The optical lens cell of claim 4, wherein said first flexible tab member is a cantilevered member.

6. The optical lens cell of claim 4, wherein said first optic support surface further comprises:
a second flexible tab member positioned diametrically across from said first flexible tab member and configured to be resiliently biased in the axial direction when the first optic is contained in said interior of said optic support structure.

7. The optical lens cell of claim 6, wherein said first optic support surface further comprises:
third and fourth flexible tab members positioned in diametrically opposed relation to each other and configured to be resiliently biased in the axial direction when the first optic is contained in said interior of said optic support structure.

8. The optical lens cell of claim 7, wherein said first and third flexible tab members and said second and fourth flexible tab members are positioned equidistant from each other.

9. A projection television lens system comprising:
a light source,
a focus mount coupled with said light source,
a tubular optic support structure coupled to said focus mount and having an interior with a longitudinal central axis and a first optic support surface extending around the longitudinal central axis, a first optic received by said interior of said tubular optic support structure and having a first outer circumferential edge and a first mounting surface portion adjacent said first circumferential edge, said first mounting surface extending transverse to the longitudinal central axis, a plurality of raised surface members positioned on said first optic support surface and raised from said first optic support surface in a direction extending along the longitudinal central axis, and at least a first resilient member extending transverse to said longitudinal central axis and contacting said first mounting surface portion of the first optic, said first resilient member applying a biasing force against said first mounting surface portion along the longitudinal central axis to force said first optic against said raised surface members of said first optic support surface.

10. The projection television lens system of claim 9, wherein said light source is a CRT.

11. The projection television lens system of claim 9, wherein said optic support structure and said focus mount are rotatably secured to one another to provide said focus adjustment.

12. The projection television lens system of claim 9, wherein said first optic support surface, said raised surface members and said first resilient member are positioned within a groove in the interior of said optic support structure.

13. The projection television lens system of claim 9, wherein:
said interior of said optic support structure further includes a second optic support surface extending around the longitudinal central axis for receiving a second optic having a second outer circumferential edge and a second mounting surface portion adjacent said second circumferential edge and extending transverse to the longitudinal central axis, a plurality of raised surface members on said second optic support surface, and at least a second resilient member extending transverse to said longitudinal central axis and configured to contact said second mounting surface portion of the second optic when said second optic is positioned adjacent said second optic support surface, said second resilient member further configured to apply a biasing force along the longitudinal central axis to force said second optic against said raised surface members of said second optic support surface.

14. The projection television lens system of claim 9, wherein said first resilient member further comprises a first flexible tab member angled toward said first optic support surface and configured to be resiliently biased in an axial direction to provide an interference fit when the first optic is contained in said interior of said optic support structure.

15. The projection television lens system of claim 14, wherein said first flexible tab member is a cantilevered member.

16. The projection television lens system of claim 14, wherein said first optic support surface further comprises:
a second flexible tab member positioned diametrically across from said first flexible tab member and configured to be resiliently biased in the axial direction when the first optic is contained in said interior of said optic support structure.

17. The projection television lens system of claim 16, wherein said first optic support surface further comprises:

third and fourth flexible tab members positioned in diametrically opposed relation to each other and configured to be resiliently biased in the axial direction when the first optic is contained in said interior of said optic support structure.

18. The projection television lens system of claim 17, wherein said first and third flexible tab members and said second and fourth flexible tab members are positioned equidistant from each other.

19. A projection television lens system comprising:

a light source, a focus mount coupled with said light source, a generally cylindrical optic support structure coupled to said focus mount and having an interior with a longitudinal central axis and a first optic support surface extending around the longitudinal central axis, and said optic support structure being movable relative to said focus mount along said longitudinal central axis to provide focus adjustment, a first optic received by said interior of said tubular optic support structure and having a first outer circumferential edge and a first mounting surface portion adjacent said first circumferential edge, said first mounting surface extending transverse to the longitudinal central axis, a plurality of raised surface members on said first optic support surface, and at least four flexible tab members extending transverse to said longitudinal central axis and contacting said first mounting surface portion of the first optic, said flexible tab members being positioned at equidistant spacings relative to each other and together applying a biasing force against said first mounting surface portion along the longitudinal central axis to force said first optic against said raised surface members of said first optic support surface.

* * * * *